United States Patent
Jaro et al.

(10) Patent No.: US 8,045,955 B2
(45) Date of Patent: Oct. 25, 2011

(54) IMPLICIT EMERGENCY REGISTRATION SET

(75) Inventors: Gabor Jaro, Budapest (HU); Jozsef Varga, Nagydobsza (HU)

(73) Assignee: Nokia Siemens Networks, Espoo (FI)

( * ) Notice: Subject to any disclaimer, the term of this patent is extended or adjusted under 35 U.S.C. 154(b) by 914 days.

(21) Appl. No.: 12/068,553

(22) Filed: Feb. 7, 2008

(65) Prior Publication Data

US 2009/0202047 A1    Aug. 13, 2009

(51) Int. Cl.
*H04M 11/04*    (2006.01)
(52) U.S. Cl. ................................ 455/404.1; 455/521
(58) Field of Classification Search ............... 455/404.1, 455/404.2, 435.2, 521
See application file for complete search history.

(56) References Cited

U.S. PATENT DOCUMENTS

| | | | |
|---|---|---|---|
| 2008/0089486 A1* | 4/2008 | Madour et al. | 379/45 |
| 2008/0101582 A1* | 5/2008 | Hua et al. | 379/220.01 |
| 2008/0176538 A1* | 7/2008 | Terrill et al. | 455/414.1 |
| 2009/0116623 A1* | 5/2009 | Ku et al. | 379/45 |
| 2010/0232422 A1* | 9/2010 | Blanco et al. | 370/352 |

* cited by examiner

*Primary Examiner* — Jinsong Hu
*Assistant Examiner* — Michael Nguyen
(74) *Attorney, Agent, or Firm* — Squire, Sanders & Dempsey (US) LLP

(57) ABSTRACT

A method for providing an implicit emergency registration set is disclosed. The method can include initiating an identifier selection procedure. The method can also include identifying whether a user has a dedicated emergency telephone uniform resource identifier (tel URI), and, if so, selecting it. The method can further include identifying, when the user does not have a dedicated emergency tel URI, whether the user's internet protocol (IP) multimedia private identity (IMPI) is known. The method can additionally include identifying, when the user's IMPI is known, whether the user's IMPI has a non-shared tel URI, and, if so, selecting it, but otherwise selecting a tel URI of the user's IMPI. The method can also include identifying, when the user's IMPI is not known, whether a shared tel URI is available, and selecting it if it is, otherwise selecting a tel URI from a non-shared set.

24 Claims, 3 Drawing Sheets

IMPLICIT EMERGENCY REGISTRATION SET

BACKGROUND OF THE INVENTION

1. Field of the Invention

The present invention is generally related to the field of telecommunications. For example, the present invention may be applicable to mobile telecommunications, such as communication using wireless communication devices. In one example, the present invention can be applied to mobile communications as discussed and defined by the Third Generation Partnership Project (3GPP). More particularly, the present invention may be of use in procedures for emergency registrations as described in 3GPP TS 24.229.

2. Description of the Related Art

The term "implicit registration set" is not conventionally clarified for emergency public user identities. The emergency public user identities as Session Initiation Protocol (SIP) Uniform Resource Identifiers (URIs) are constructed from normal public user identities adding the "sos." tag, but it is unlikely that distinct telephone (tel) URIs will be available for emergency registration, thus tel URIs used as normal public user identities will be reused as emergency public user identities as well. Generic mechanism to define implicit registration sets for emergency public user identities are conventionally absent. Direct mapping (i.e. add the "sos." to all SIP URIs in the set and keep tel URIs unchanged) does not work as for emergency registration it is conventionally mandatory to implicitly register a tel URI, while it is not a requirement for "normal" registration. Also creating a "superset" by adding all SIP URIs with a "sos." tag and the tel URI(s) is not feasible as the shared/not shared property of the tel URI must conventionally be kept, even if it is used as an emergency public user identity.

A solution such as a new URI parameter to have distinct tel URI is not conventionally acceptable, because it cannot conventionally be used in the case of callbacks received from a Public Safety Answering Point (PSAP) in a Circuit Switched (CS) network.

SUMMARY OF THE INVENTION

One embodiment of the present invention can be a method including initiating an identifier selection procedure. The method can also include identifying whether a user has a dedicated emergency telephone uniform resource identifier, and, when the user has the dedicated emergency telephone uniform resource identifier, selecting the dedicated emergency telephone uniform resource identifier. The method can further include identifying, when the user does not have the dedicated emergency telephone uniform resource identifier, whether the user's internet protocol multimedia private identity is known. The method can additionally include identifying, when the user's internet protocol multimedia private identity is known, whether the user's internet protocol multimedia private identity has a non-shared telephone uniform resource identifier, and selecting the non-shared telephone uniform resource identifier when the user's internet protocol multimedia private identity has the non-shared telephone uniform resource identifier, otherwise selecting a telephone uniform resource identifier of the user's internet protocol multimedia private identity. The method can also include identifying, when the user's internet protocol multimedia private identity is not known, whether a shared telephone uniform resource identifier is available, and selecting the shared telephone uniform resource identifier when the shared telephone uniform resource identifier is available, otherwise selecting a telephone uniform resource identifier from a non-shared set.

Another embodiment of the present invention can be an apparatus including a processor configured to initiate an identifier selection procedure. The processor is configured to identify whether a user has a dedicated emergency telephone uniform resource identifier, and, when the user has the dedicated emergency telephone uniform resource identifier, the processor is configured to select the dedicated emergency telephone uniform resource identifier. The processor is further configured to identify, when the user does not have the dedicated emergency telephone uniform resource identifier, whether the user's internet protocol multimedia private identity is known. The processor is additionally configured to identify, when the user's internet protocol multimedia private identity is known, whether the user's internet protocol multimedia private identity has a non-shared telephone uniform resource identifier, and the processor is configured to select the non-shared telephone uniform resource identifier when the user's internet protocol multimedia private identity has the non-shared telephone uniform resource identifier, otherwise to select a telephone uniform resource identifier of the user's internet protocol multimedia private identity. The processor is also configured to identify, when the user's internet protocol multimedia private identity is not known, whether a shared telephone uniform resource identifier is available, and the processor is configured to select the shared telephone uniform resource identifier when the shared telephone uniform resource identifier is available, otherwise to select a telephone uniform resource identifier from a non-shared set.

A further embodiment of the present invention can be an apparatus including initiation means for initiating an identifier selection procedure. The apparatus can also include first identification means for identifying whether a user has a dedicated emergency telephone uniform resource identifier, and, when the user has the dedicated emergency telephone uniform resource identifier, for selecting the dedicated emergency telephone uniform resource identifier. The apparatus can further include second identification means for identifying, when the user does not have the dedicated emergency telephone uniform resource identifier, whether the user's internet protocol multimedia private identity is known. The apparatus can additionally include third identification means identifying, when the user's internet protocol multimedia private identity is known, whether the user's internet protocol multimedia private identity has a non-shared telephone uniform resource identifier, and for selecting the non-shared telephone uniform resource identifier when the user's internet protocol multimedia private identity has the non-shared telephone uniform resource identifier, otherwise selecting a telephone uniform resource identifier of the user's internet protocol multimedia private identity. The apparatus can also include fourth identification means for identifying, when the user's internet protocol multimedia private identity is not known, whether a shared telephone uniform resource identifier is available, and for selecting the shared telephone uniform resource identifier when the shared telephone uniform resource identifier is available, otherwise selecting a telephone uniform resource identifier from a non-shared set.

An additional embodiment of the present invention can include a computer program embodied on a computer readable medium and encoding instructions for performing a method when executed on a hardware device. The method can include initiating an identifier selection procedure. The method can also include identifying whether a user has a dedicated emergency telephone uniform resource identifier, and, when the user has the dedicated emergency telephone uniform resource identifier, selecting the dedicated emergency telephone uniform resource identifier. The method can further include identifying, when the user does not have the dedicated emergency telephone uniform resource identifier, whether the user's internet protocol multimedia private identity is known. The method can additionally include identifying, when the user's internet protocol multimedia private identity is known, whether the user's internet protocol multimedia private identity has a non-shared telephone uniform resource identifier, and selecting the non-shared telephone uniform resource identifier when the user's internet protocol multimedia private identity has the non-shared telephone uniform resource identifier, otherwise selecting a telephone uniform resource identifier of the user's internet protocol multimedia private identity. The method can also include identifying, when the user's internet protocol multimedia private identity is not known, whether a shared telephone uniform resource identifier is available, and selecting the shared telephone uniform resource identifier when the shared telephone uniform resource identifier is available, otherwise selecting a telephone uniform resource identifier from a non-shared set.

Another embodiment of the present invention is a method including selecting an identifier into an implicit emergency registration set. The identifier is selected based on whether a corresponding user has a dedicated emergency telephone uniform resource indicator. The identifier can be selected further based on whether an internet protocol multimedia private identity of the user is known. The identifier can be selected further based on whether the internet protocol multimedia private identity has a non-shared telephone uniform resource identifier. The identifier can be selected further based on whether a shared telephone uniform resource identifier is available.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

As mentioned above, certain embodiments of the present invention relate to procedures for emergency registration that are described in 3GPP TS 24.229. Also, as noted above, the term "implicit registration set" is not conventionally clarified for emergency public user identities.

Accordingly, in certain embodiments of the present invention, public user identities used to create the implicit emergency registration set in the Home Subscriber Server (HSS) are marked, a separate "implicit emergency registration set" is not stored in the HSS (the implicit emergency registration set is used only in case of emergency registration and has no role in IMS registration), and the implicit emergency registration set is considered as a "virtual set" of subscriptions that is created on-the-fly using the marked public user identities. This will be discussed in more detail, below.

In the HSS, the emergency public user identities do not need to be stored as separate public user identities (except if operator assigns a tel-URI to the subscription (IP Multimedia Private Identity (IMPI))) for emergency call purpose only), but an extra "flag" (e-Reg indication) beside the public user identities is used to mark them. If the IP Multimedia Public Identity (IMPU) has an e-Reg indication that IMPU is used in both normal IMS registration and emergency registration. If there is no indication about the e-Reg, the IMPU is neglected from emergency registration point of view.

The "implicit emergency registration set" is created from implicit registration set(s). The HSS filters out all the IMPUs that does not have an e-Reg indication.

As an important element for emergency registration can be to have one and only one tel-URI (i.e. always have a consistent callback number) registered with every emergency registration, the construction method for the "implicit emergency registration set" is defined depending on the share-status of the tel-URI in the subscription and the existence of dedicated tel-URI that can be used for emergency registration and emergency call only.

Thus, if the user has a dedicated emergency tel-URI, that one is used. Otherwise, if the IMPI is known, and if the IMPI has a non-shared tel-URI, that one is used. Likewise, if the IMPI is known, but the IPMI has a shared tel-URI, then a tel-URI belonging to the IMPI (in a shared implicit registration set) can be picked (as there normally will always be at least one).

If the IMPI is not known (e.g. early IMS registration), but if a shared tel-URI is available, that one is used. Otherwise, if the IMPI is not known and no share tel-URI is available, then a tel-URI from non-shared set can be picked (as there normally will always be at least one).

Each IMPI can have at least one tel-URI that can be used for emergency registration. It might be a non-shared or shared tel-URI. The list is extended, for example, with the SIP URI used in registration.

Figure 1:
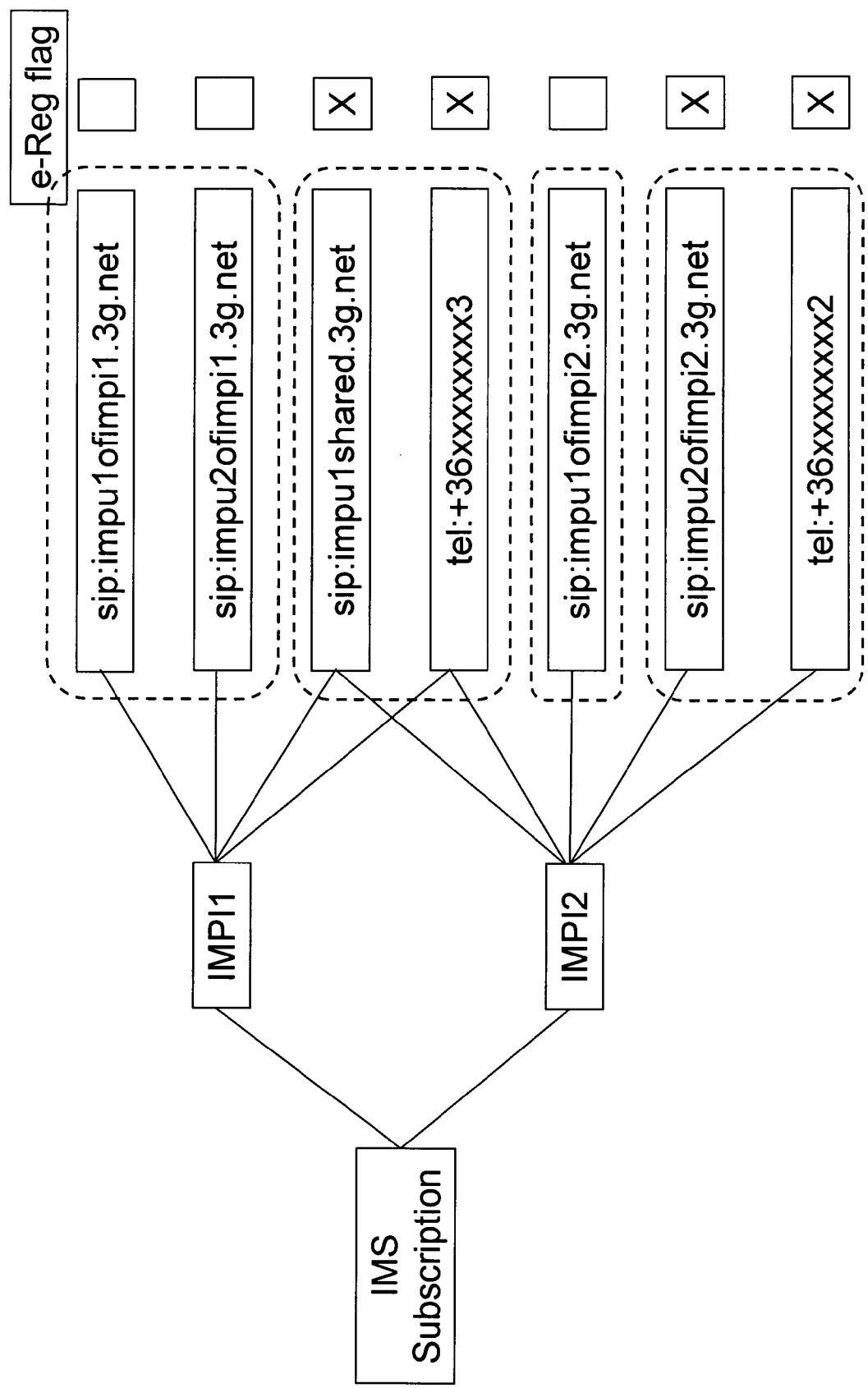
FIG. 1 illustrates an example of Internet Protocol (IP) Multimedia Subsystem (IMS) subscription.

Let's suppose an example in which the user has a subscription as illustrated in FIG. 1. Assuming that impi2 e-registers with sip:sos.impulofimpi1.3 g.net (the HSS is queried with that Identification (ID)), the "implicit emergency registration set" is created from the IMPUs that belong to IMPI1 and have an emergency registration indication.

As the target is to have one and only one tel URI, in this example the tel-URI from the shared set is selected, thus the implicit emergency registration set looks like +36xxxxxxxxxx3 sip:sos.impulofimpi1.3g.net

One advantage of this embodiment is that there is no need to store implicit emergency registration sets in the HSS at all, just the markers. Thus, the database size can be reduced, requiring less maintenance and producing less confusion.

Figure 2:
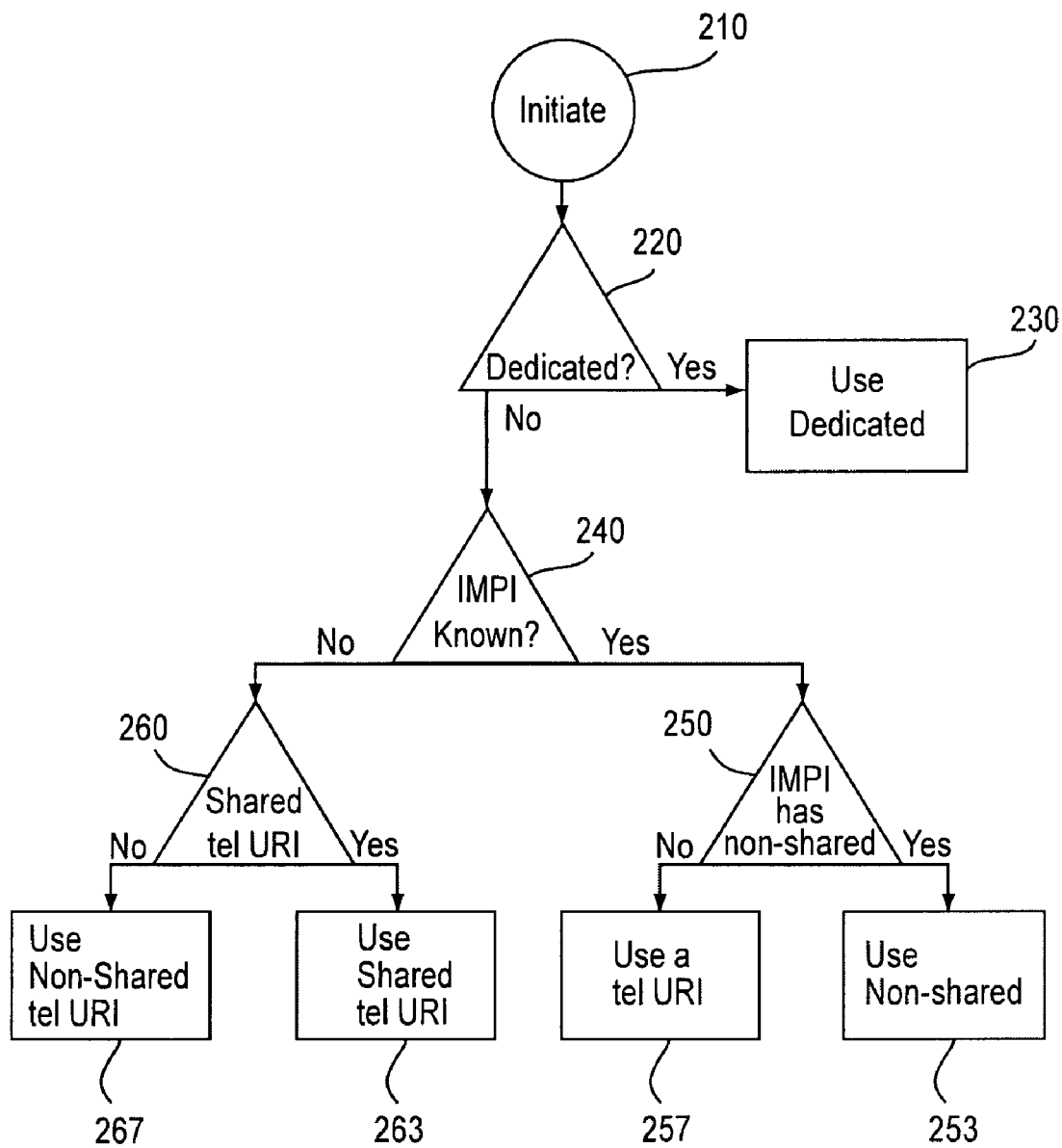
FIG. 2 illustrates a method according to an embodiment of the present invention.

One embodiment of a method according to the present invention is illustrated in FIG. 2. As shown in FIG. 2, the method includes initiating 210 an identifier selection procedure. The initiating 210 the identifier selection procedure can be performed pursuant to an emergency registration procedure.

The method also includes identifying 220 whether a user has a dedicated emergency telephone uniform resource identifier, and, when the user has the dedicated emergency telephone uniform resource identifier, selecting 230 the dedicated emergency telephone uniform resource identifier for use.

The method illustrated in FIG. 2 also includes identifying 240, when the user does not have the dedicated emergency telephone uniform resource identifier, whether the user's internet protocol multimedia private identity is known. The method further includes identifying 250, when the user's internet protocol multimedia private identity is known, whether the user's internet protocol multimedia private identity has a non-shared telephone uniform resource identifier, and selecting 253 the non-shared telephone uniform resource identifier for use when the user's internet protocol multimedia private identity has the non-shared telephone uniform resource identifier, otherwise selecting 257 a telephone uniform resource identifier of the user's internet protocol multimedia private identity for use.

The method shown in FIG. 2 additionally includes identifying 260, when the user's internet protocol multimedia private identity is not known, whether a shared telephone uniform resource identifier is available, and selecting 263 the shared telephone uniform resource identifier for use when the shared telephone uniform resource identifier is available, otherwise selecting 267 a telephone uniform resource identifier from a non-shared set for use.

In the method, as mentioned above, no separate implicit emergency registration set need be stored. Furthermore, each of the selectings involved in the method can include marking the item selected. The item selected can be marked by activating an emergency registration flag. The method can be performed as part of a session initiation procedure, and particularly as part of an emergency session initiation procedure.

Figure 3:
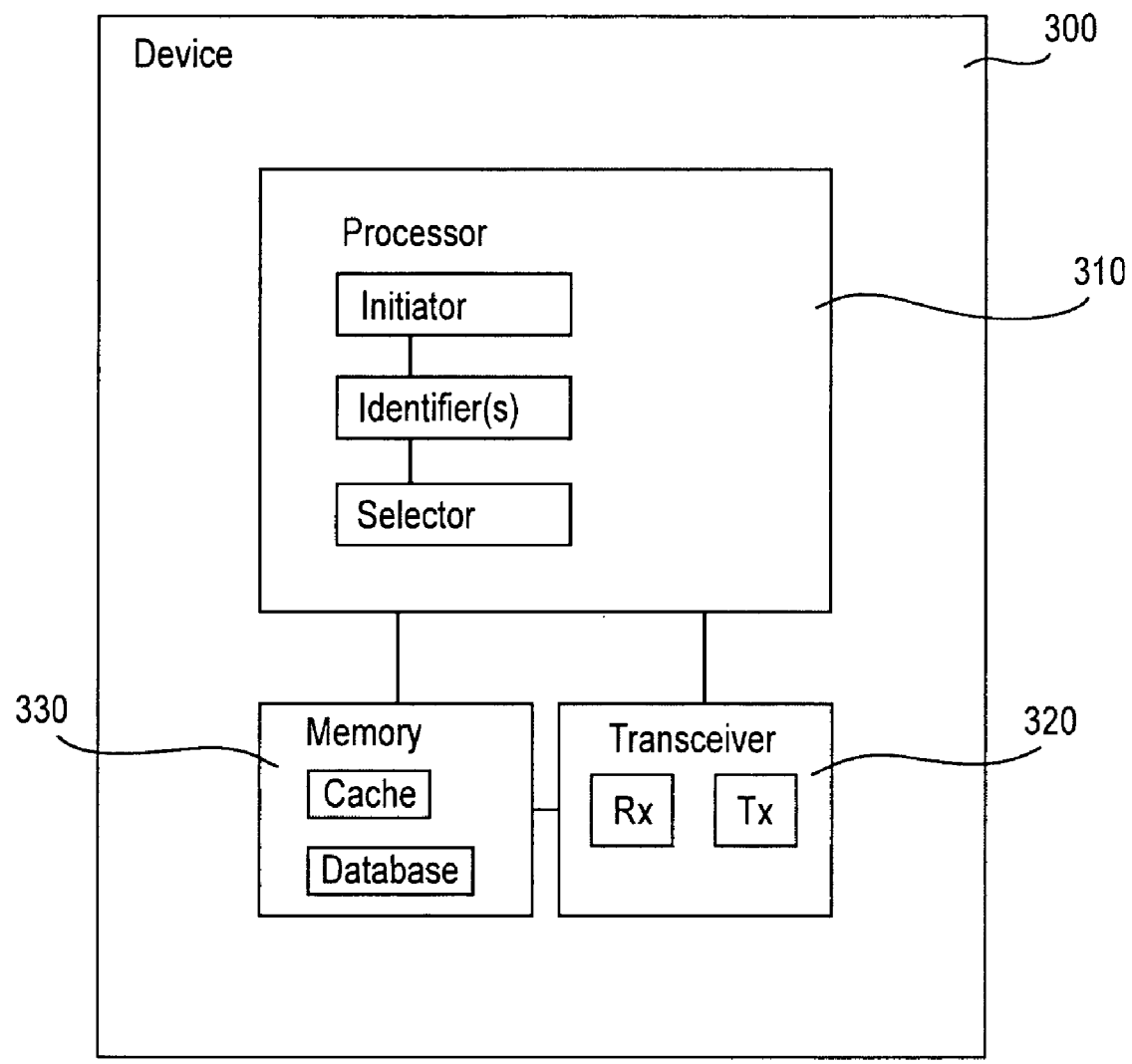
FIG. 3 illustrates a device according to an embodiment of the present invention.

FIG. 3 illustrates a device 300 according to an embodiment of the present invention. The device 300, as illustrated, includes a processor 310, a transceiver 320, and a memory 330. This configuration is simply an example, it is not mandatory. As illustrated, the memory 330 includes a cache and a database. A cache may be useful for the processing tasks of the processor 310, and/or the operation of the transceiver 320. Likewise, a database may be useful for the processing in the processor. The memory 330 may also include encoded software, operating system(s), and the like. The memory 330 can be an electronically programmable memory, a read-only memory, a removable memory, or any similar storage unit. One of ordinary skill in the art will appreciate that the hardware specifics of the memory 330 may vary depending on the particular implementation.

The transceiver 320 can include Receive (Rx) and Transmit (Tx) portions. These may be functional portions—it is not necessary to have completely separate transmit and receive paths in the transceiver 320 in particular or the device 330 in general. Indeed, the transceiver 320 is only useful in embodiments when the device 300 is a communication device.

The device 300 can also include a processor 310, which can include various functional units. As shown in FIG. 3, the processor can include an initiator, one or more identifiers, and a selector. These functional units can be implemented using a single processor chip, although it is not absolutely required that a single chip be used. Thus, for example, the same processor 310 can be a single chip that implements various functional units. The processor 310 can be a general purpose computer processor, an Application Specific Integrated Circuit (ASIC) or the like. One of ordinary skill in the art will appreciate that the hardware specifics of the processor 310 may depend on the particular functions at hand.

The processor 310 can, for example, be configured to initiate an identifier selection procedure. The processor 310 can also be configured to identify whether a user has a dedicated emergency telephone uniform resource identifier, and, when the user has the dedicated emergency telephone uniform resource identifier, the processor 310 can be configured to select the dedicated emergency telephone uniform resource identifier. The processor 310 can be further configured to identify, when the user does not have the dedicated emergency telephone uniform resource identifier, whether the user's internet protocol multimedia private identity is known.

The processor 310 can be additionally configured to identify, when the user's internet protocol multimedia private identity is known, whether the user's internet protocol multimedia private identity has a non-shared telephone uniform resource identifier, and the processor can be configured to select the non-shared telephone uniform resource identifier when the user's internet protocol multimedia private identity has the non-shared telephone uniform resource identifier, otherwise to select a telephone uniform resource identifier of the user's internet protocol multimedia private identity.

The processor 310 can be further configured to identify, when the user's internet protocol multimedia private identity is not known, whether a shared telephone uniform resource identifier is available, and the processor can be configured to select the shared telephone uniform resource identifier when the shared telephone uniform resource identifier is available, otherwise to select a telephone uniform resource identifier from a non-shared set.

In another example, the processor 310 can implement the method shown in FIG. 2, by use of a computer program embodied on a computer readable medium (such as memory 330) and encoding instructions for performing the method shown in FIG. 2 when executed on hardware device 300.

The processor 310 can be configured to perform the identifier selection procedure pursuant to an emergency registration procedure. Furthermore, the processor 310 can be configured to store no separate implicit emergency registration set. The processor 310 can be configured to make each of the selections discussed above by marking the item selected. The marking of the selected item can include activating an emergency registration flag of (or corresponding to) the selected item. The marking can be performed by a separate functional sub-unit of the processor 310, and consequently there is no need for any additional unit to providing marking functionality. The device 300 (and the processor 310) can be configured to operate in accordance with a session initiation protocol.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   initiating, in a processor, an identifier selection procedure;
   identifying, by the processor, whether a user has a dedicated emergency telephone uniform resource identifier, and, when the user has the dedicated emergency telephone uniform resource identifier, selecting the dedicated emergency telephone uniform resource identifier;
   identifying, by the processor, when the user does not have the dedicated emergency telephone uniform resource identifier, whether the user's internet protocol multimedia private identity is known;
   identifying, by the processor, when the user's internet protocol multimedia private identity is known, whether the user's internet protocol multimedia private identity has a non-shared telephone uniform resource identifier, and selecting the non-shared telephone uniform resource identifier when the user's internet protocol multimedia private identity has the non-shared telephone uniform resource identifier, otherwise selecting a telephone uniform resource identifier of the user's internet protocol multimedia private identity; and identifying, by the processor, when the user's internet protocol multimedia private identity is not known, whether a shared telephone uniform resource identifier is available, and selecting the shared telephone uniform resource identifier when the shared telephone uniform resource identifier is available, otherwise selecting a telephone uniform resource identifier from a non-shared set.

2. The method of claim 1, wherein the initiating the identifier selection procedure is performed pursuant to an emergency registration procedure.

3. The method of claim 1, wherein no separate implicit emergency registration set is stored.

4. The method of claim 1, wherein each of the selectings comprises marking the item selected.

5. The method of claim 4, wherein the marking comprises activating an emergency registration flag.

6. The method of claim 1, wherein the method is performed as part of a session initiation procedure.

7. An apparatus, comprising:
a processor configured to initiate an identifier selection procedure,
wherein the processor is configured to identify whether a user has a dedicated emergency telephone uniform resource identifier, and, when the user has the dedicated emergency telephone uniform resource identifier, the processor is configured to select the dedicated emergency telephone uniform resource identifier,
wherein the processor is further configured to identify, when the user does not have the dedicated emergency telephone uniform resource identifier, whether the user's internet protocol multimedia private identity is known,
wherein the processor is additionally configured to identify, when the user's internet protocol multimedia private identity is known, whether the user's internet protocol multimedia private identity has a non-shared telephone uniform resource identifier, and the processor is configured to select the non-shared telephone uniform resource identifier when the user's internet protocol multimedia private identity has the non-shared telephone uniform resource identifier, otherwise to select a telephone uniform resource identifier of the user's internet protocol multimedia private identity, and
wherein the processor is also configured to identify, when the user's internet protocol multimedia private identity is not known, whether a shared telephone uniform resource identifier is available, and the processor is configured to select the shared telephone uniform resource identifier when the shared telephone uniform resource identifier is available, otherwise to select a telephone uniform resource identifier from a non-shared set.

8. The apparatus of claim 7, wherein the processor is configured to perform the identifier selection procedure pursuant to an emergency registration procedure.

9. The apparatus of claim 7, wherein the processor is configured to store no separate implicit emergency registration set.

10. The apparatus of claim 7, wherein the processor is configured to make each of the selections by marking the item selected.

11. The apparatus of claim 10, wherein the marking comprises activating an emergency registration flag.

12. The apparatus of claim 7, wherein the apparatus is configured to operate in accordance with a session initiation protocol.

13. An apparatus, comprising:
initiation means for initiating an identifier selection procedure;
first identification means for identifying whether a user has a dedicated emergency telephone uniform resource identifier, and, when the user has the dedicated emergency telephone uniform resource identifier, for selecting the dedicated emergency telephone uniform resource identifier;
second identification means for identifying, when the user does not have the dedicated emergency telephone uniform resource identifier, whether the user's internet protocol multimedia private identity is known;
third identification means identifying, when the user's internet protocol multimedia private identity is known, whether the user's internet protocol multimedia private identity has a non-shared telephone uniform resource identifier, and for selecting the non-shared telephone uniform resource identifier when the user's internet protocol multimedia private identity has the non-shared telephone uniform resource identifier, otherwise selecting a telephone uniform resource identifier of the user's internet protocol multimedia private identity; and
fourth identification means for identifying, when the user's internet protocol multimedia private identity is not known, whether a shared telephone uniform resource identifier is available, and for selecting the shared telephone uniform resource identifier when the shared telephone uniform resource identifier is available, otherwise selecting a telephone uniform resource identifier from a non-shared set.

14. The apparatus of claim 13, wherein the initiating means is configured to initiate the identifier selection procedure pursuant to an emergency registration procedure.

15. The apparatus of claim 13, wherein the apparatus is configured to store no separate implicit emergency registration set.

16. The apparatus of claim 13, further comprising:
marking means for marking any item selected by any of the identification means.

17. The apparatus of claim 16, wherein the marking means is configured to activate an emergency registration flag.

18. The apparatus of claim 13, wherein the apparatus is configured to operate in accordance with a session initiation protocol.

19. A non-transitory computer readable medium encoding instructions for performing a method when executed on a hardware device, the method comprising:
initiating an identifier selection procedure;
identifying whether a user has a dedicated emergency telephone uniform resource identifier, and, when the user has the dedicated emergency telephone uniform resource identifier, selecting the dedicated emergency telephone uniform resource identifier;
identifying, when the user does not have the dedicated emergency telephone uniform resource identifier, whether the user's internet protocol multimedia private identity is known;
identifying, when the user's internet protocol multimedia private identity is known, whether the user's internet protocol multimedia private identity has a non-shared telephone uniform resource identifier, and selecting the non-shared telephone uniform resource identifier when the user's internet protocol multimedia private identity has the non-shared telephone uniform resource identifier, otherwise selecting a telephone uniform resource identifier of the user's internet protocol multimedia private identity; and identifying, when the user's internet protocol multimedia private identity is not known, whether a shared telephone uniform resource identifier is available, and selecting the shared telephone uniform resource identifier when the shared telephone uniform resource identifier is available, otherwise selecting a telephone uniform resource identifier from a non-shared set.

20. The non-transitory computer readable medium of claim 19, wherein the initiating the identifier selection procedure is performed pursuant to an emergency registration procedure.

21. The non-transitory computer readable medium of claim 19, wherein no separate implicit emergency registration set is stored.

22. The non-transitory computer readable medium of claim 19, wherein each of the selectings comprises marking the item selected.

23. The non-transitory computer readable medium of claim 22, wherein the marking comprises activating an emergency registration flag.

24. The non-transitory computer readable medium of claim 19, wherein the method is performed as part of a session initiation procedure.

* * * * *